April 1, 1958 — L. M. SILVA — 2,829,329
SERVO CONTROL SYSTEM
Filed Aug. 16, 1954 — 2 Sheets-Sheet 1

INVENTOR.
LAWRENCE M. SILVA
BY HIS ATTORNEYS.
HARRIS, KIECH, FOSTER & HARRIS

April 1, 1958 L. M. SILVA 2,829,329
SERVO CONTROL SYSTEM
Filed Aug. 16, 1954 2 Sheets-Sheet 2

INVENTOR.
LAWRENCE M. SILVA
BY HIS ATTORNEYS.
HARRIS, KIECH, FOSTER & HARRIS 2,829,329

SERVO CONTROL SYSTEM

Lawrence M. Silva, Fullerton, Calif.

Application August 16, 1954, Serial No. 450,199

21 Claims. (Cl. 318—448)

This invention relates to servo control systems and in particular to those applicable to both "zeroing" and "following" operations.

All servo control systems are characterized by having a controlled element and a controlling element. In the "zeroing" type of operation the status of the controlling element is fixed and the purpose of the servo control system is to reduce any deviation of the controlled element from this fixed status to less than some acceptable maximum. This deviation is ordinarily called the error, hence the servo control system brings the error to "zero." In the "following" type of operation the status of the controlling element is influenced by factors foreign to the servo control system. The purpose of the servo control system is to change the status of the controlled element to correspond to the changes in the controlling element brought on by the outside factors. Hence, the controlled element "follows" the controlling element, lagging behind less than some acceptable maximum. The deviation in the "zeroing" operation and the lag in the "following" operation may be referred to as the status difference between the controlled and the controlling elements. It is an object of this invention to provide a servo control system which will reduce this difference in status to less than a predetermined maximum in an optimum period of time without hunting or other unstable phenomena.

The status difference to be controlled may be that of any characteristic for which status-sensing devices can be provided, such as difference in position, velocity, volume, temperature, color, light intensity, chemical concentration, etc. This listing is not to be considered as a limitation on the applicability of the invention. A further object of this invention is to provide a servo control system which can function with the signals from any type of status-sensing device.

It can be shown by mathematical analysis and is readily apparent from a physical analysis of simpler cases that a difference in a system can be reduced to zero in the minimum amount of time by operating the system at its maximum output in plus and/or minus directions for the entire corrective period. An example is that of driving an automobile from point A to point B. The automobile has a maximum acceleration rate and a maximum deceleration or braking rate. Starting from A the maximum acceleration is applied and the automobile's speed increases steadily. At some point X, intermediate points A and B, the acceleration is removed and the brakes are applied to obtain maximum deceleration. From this point on the car's speed steadily decreases, and if X was selected properly, the automobile will stop precisely at B, arriving there in the absolute minimum elapsed time. Two problems are present in this method of control; where is point X, and, what if through some error or intervening change in position of B the automobile does not stop exactly at B? An object of this invention is to provide a servo control system which gives an automatic and precise solution for these problems.

When applying the above analysis to a system having a third order equation of motion, three forcing periods are required. If in the example given above a third order system was being driven from A to B, the deceleration would be removed at a point intermediate X and B and acceleration would be applied again until point B was reached. Similarly with any higher order system, the number of forcing periods required in order to achieve the desired correction in the absolute minimum time is equal to the order of the equation of motion of the system being controlled.

Two classes of servo control systems were known in the past, on-off control and continuous control. Neither of these operate in the ideal manner described above. In the on-off control, the power system supplies only two fixed amounts of corrective action, an output tending to reduce a difference in a plus direction and an output tending to reduce a difference in a minus direction. The two may or may not be equal in magnitude and one may be zero or substantially so. When the difference becomes greater than the acceptable maximum, the on-off control produces an output of fixed magnitude tending to reduce this difference and this output continues until the difference is reduced to less than the maximum. Then the corrective action ceases. Differences in status can be reduced in short periods of time by use of large outputs or corrective action in the control system. But since the magnitude of the correction is constant and at a high fixed rate regardless of the degree of difference, an overshooting of the zero difference point may occur resulting in a difference of opposite sign calling for maximum corrective action in the opposite direction. This recurring application of large outputs causes oscillation of the controlled member and is an undesirable condition. A user of this class of control must be content with continual hunting.

In the continuous control, the power system output is a linear differential function of the difference in status. For large differences, large outputs are generated and as the difference is reduced the output also decreases. This characteristic of the continuous control gives stable operation without hunting and permits the use of a small maximum acceptable difference. However, the time consumed in reducing large differences is considerably greater than that for an on-off control. Another object of this invention is to provide a servo control system which does not have the objectionable features of the controls discussed above.

The problem of instrumenting servo control systems to perform according to the ideal prescribed by mathematical and physical analysis is difficult and with respect to third and higher order systems only highly impractical solutions have been produced. Accordingly, a further object of this invention is to provide an achievable practical system for control of systems, especially those of third and higher order, which is small, simple and inexpensive to produce, yet which very closely approximates the ideal control in performance.

A still further object of the invention is to provide a servo control system which reduces a difference in status between the controlled member and the controlling member of a system of third or higher order in the following manner: first, application of maximum corrective action tending to reduce the status difference for a first period of time immediately following the creation of the difference; second, application of a maximum corrective action opposing the first corrective action for a second period of time following the first period of time; and, third, application of corrective action of magnitude less than maximum and substantially proportional to the magnitude of the then-existing difference. A servo control system having this type of operation will provide the large magnitudes of corrective action and the rapid reduction of difference characteristic of the on-off control when a difference initially exists, but will also provide the stable nonhunting characteristic of the continuous control at the end of the difference reducing period, thereby permitting the selection of a very small acceptable maximum difference.

Another object of the invention is to provide a servo control system having a controller which produces an output which is a non-linear integro-differential function of the difference in status of the controlled and controlling elements and having a power system the output of which is continuously variable between predetermined limits.

A further object of the invention is to provide a controller for a servo control system which may be constituted entirely of passive elements having no energy sources.

Other objects and advantages of the invention and various features of construction and operation thereof will become apparent to those skilled in the art upon reference to the following specification and the accompanying drawings wherein certain embodiments of the invention are illustrated.

Referring to the drawings, which are diagrammatic only but which suggest to those skilled in the art the basis for the present invention and exemplary instrumentation thereof.

Servo control systems employing feedback are essentially devices for controlling the source of power which is supplied to the controlled element. The classical feed-back system design methods are firmly based on considerations of stability and disregard the limitations of the power source despite the fact that the size of the source is the basic economic factor in the design of the system. The transient and steady state performance of a servo control system is fundamentally limited by the characteristics and limitations of the power source and the controlled element which, in conjunction with the characteristics of the controlling element, represent the "fixed elements" of the system which have to be accepted in the design. Given these "fixed elements," then the design of an optimum servo control system requires the synthesis of a controller which controls the power supplied to the controlled element and which will provide for the maximum utilization of the power source.

The design of the predictor type of servo control system of the invention is based on the above considerations and will result in an optimum control system with minimum time response. If the magnitude of the corrective action is fixed, the transient response of the predictor type system will be appreciably faster than that of its continuous or linear equivalent, or conversely, if the speed of response of a continuous system is adequate, this same response can be obtained with a smaller corrective action in a predictor type servo.

In order to achieve the maximum utilization of the power source to reduce the difference in status to zero in the minimum time, it is necessary to have knowledge of the difference in status and of its derivatives. In a predictor type servo, the application of corrective action is governed by the magnitude of the difference in status and its derivatives. The number of derivatives which are ideally required is fixed by the order of the differential equation of the system. For an $n$th order system $n-1$ derivatives are ideally required. However, in practice it is sometimes found that the higher derivatives cannot be obtained due to the existence of "noise" or other considerations.

The basic concept of the predictor control of the invention is that the controller accepts information concerning the present value of the difference in status, computes one or more derivatives of this value, and bases its corrective action on a prediction of the future value of the difference. Thus, if a signal representing the magnitude of the difference in status and its first derivative is used by the controller, it will base its corrective action on the straight line relationship obtained from the consideration of this information. For the method of control action desired the prediction of future values of the difference in status is required only for periods of time comparable to a fraction of the response time of the controlled system. In the invention, the actual prediction process is inherent in the design of the controller and need not be performed by separate means.

Figure 1A:
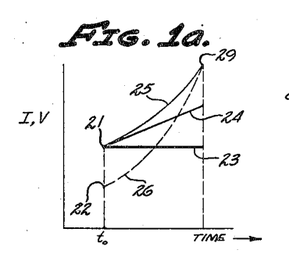
Figs. 1a, 1b and 1c graphically represent certain relations of the invention.
Figure 1B:
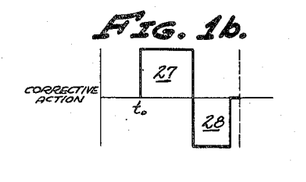

The prediction based on the magnitude and first derivative of the difference in status is ideally correct for a second order system only. A third order system theoretically requires information about the magnitude and its first and second derivatives. If the controller instrumentation for a third order system takes into consideration the second derivative, the controller will apply corrective action in the manner indicated diagrammatically in Figure 1 in which time, $t$, is plotted along the abscissa axis and the controlling element status, I, the controlled element status, V, and the corrective action exerted on the system are plotted along the ordinate axis. At time, $t_0$, the line $t_0$—21 (Fig. 1a) represents the status of the controlling element, the line $t_0$—22 represents the status of the controlled element and the difference in status is represented by the distance between points 21 and 22. Line 23 represents a prediction of the future status of the controlling element based on the magnitude of the status alone. Line 24 is a prediction based on the magnitude and its first derivative, and line 25 is based on the magnitude and its first and second derivatives. Under the influence of the corrective action supplied by the power system, the controlled element will change its status as indicated by the dashed line 26, resulting in a rapid and stable reduction of the difference to zero. The theoretical considerations leading to this result predicate a system whose operation consists of a single period of maximum corrective action 27 (Fig. 1b) followed by a single period of maximum corrective action in the opposite sense 28. At the end of the second period of corrective action the theoretical system is on a natural force free trajectory such that the curve 26 will become tangent to the curve 25 at point 29.

Figure 1C:
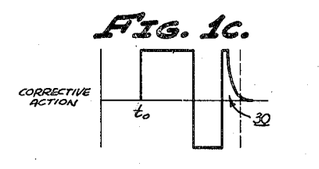

In practice, it is found that errors corrupt this idealized operation and that varying corrective action less than the maximum must be applied during the final period 30 (Fig. 1c) in order that the difference in status and its derivatives shall be reduced to zero in the optimum manner. Also, it is often expedient to base the controller instrumentation on a first derivative prediction and if this is done it will be found that the system response includes either additional corrective periods and/or a proportional corrective action during the final or third period or phase. In both instances this additional corrective action during the final period 30 results from the error made in predicting the future excursions of the controlling element and does not reflect a departure from the method of operation described in this specification.

Figure 2:
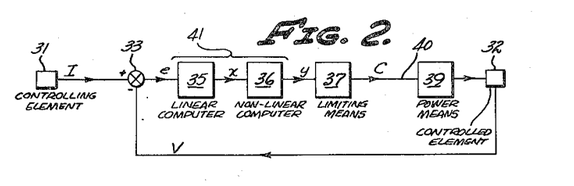
Fig. 2 is a block diagram of one embodiment of the invention.

A block diagram of a servo control system incorporating an embodiment of the invention is illustrated in Fig. 2. The basic purpose of a servo control system is to maintain the error or difference in status, $e$, between a controlling element 31 and a controlled element 32 less than some acceptable maximum, which for purposes of this analysis will be considered as zero. In Fig. 2 the numeral 31 indicates such a controlling element and a sensing means for its status, the numeral 32 indicating a controlled element and its sensing means. A signal, I, representative of the status of the controlling element is developed by the corresponding sensing means. Another signal, V, representative of the status of the controlled element is developed by the corresponding sensing means. These signals are combined in a measuring means, shown as a subtracting means 33, to produce an error signal, $e$, having the relation:

$$e = I - V, \text{ or } V = I - e$$

The difference signal is fed to a limiting means 37 serially through a controller 41. The controller in its simplest form consists of a linear computer 35 and a non-linear computer 36 serially connected, with the linear computer preceding the non-linear computer. The limiting means is coupled to a power means 39 by a connection 40 and its output, C, serves to energize the power means to exert corrective action on the controlled element 32. The limiting means output, C, is a function of the difference in status, $e$, and is continuously variable in magnitude between two predetermined limits. The limiting means may also contain a signal amplifying mechanism. Typical examples of such limiting means are a magnetic amplifier which saturates at predetermined levels for outputs in positive and negative senses, a differential relay driven by a combination of the signal and a dither or higher frequency input in what is often referred to as "Gouy modulation," and a valve controlling a hydraulic motor or piston.

In order to establsh the characteristics of the various computers, the time constants of the system must be known. The number of time constants in a system is defined by and characteristic of the order of the differential equation of the system. No distinction is made herein between integral terms and time constants, since each introduces an additional order in a differential equation of the system. Integral terms are simply the limitng case of systems with large or infinite time constants and whenever the phrase "time constant" is used in the specification and claims, it is intended that integral terms be included. The time constants and/or integrals are obtained using mathematical or empirical techniques. Thus, for example, if the significant characteristics of the power means and the controlled element can be described by a fourth order differential relation the following expression relating the system time constants $T_1 \ldots T_4$ can be written:

$$a(DT_1+1)(DT_2+1)(DT_3+1)(DT_4+1)e = -\begin{cases} A \text{ max.} \\ A \text{ min.} \end{cases}$$

where $a$ is a constant coefficient, $D$ is the derivative with respect to time, $$\frac{d}{dt}$$

and $A$ is equal to $(C-aI)$. It is necessary to specify the saturation or maximum and minimum operating levels which will be employed to achieve control or regulation. Thus, the corrective action which is applied to the controlled element 32 and which is initiated by the controller 41 will have a finite maximum and minimum value. Let C max. represent the magnitude of the maximum corrective action which is applied and C min. the minimum magnitude of corrective action. This equation applies only during periods in which the maximum corrective action, C max. or C min., is applied, i. e., 27 and 28 of Fig. 1, and is the equation from which the linear and non-linear computer characteristics are obtained.

The time constants of a system having the larger magnitudes are of greater importance in the control of differences in status. Thus, one may select two of the larger time constants of the system to be controlled and instrument a controller to provide the control functions called for by the selected time constants. Heretofore, the remaining time constants have been neglected and either performance less than optimum is accepted or some alternative method of control is added to the system thereby increasing the cost and complexity. One example of this type of control system is the multiple mode control system wherein there are two controllers, one working best on large errors, the other working best on small errors and a relay that selects which controller shall control the corrective action.

Referring to the controller 41 of Fig. 2, the first part, linear computer 35, is a means for obtaining certain specified information about the difference in status and its derivatives. The second part, the non-linear computer 36, accepts the information furnished from the linear computer 35 and manipulates the controlled element in accordance with this information. For the predictor control system the information which is furnished the non-linear computer 36 and the non-linear relationship governing the output energization of this computer is determined from a combination of the differential parameters of the system and the maximum and minimum levels of corrective action. For an $n$th order system, the information required by the second or non-linear computer 36 from the first or linear computer 35 is obtained from a combination of $n-2$ of the system time constants, and the non-linear relationship produced by the second computer 36 is derived from the remaining two system time constants. In a second order system $n-2$ is zero and the two system time constants are used in instrumenting the non-linear computer. The first or linear computer 35 is not required and the output, $e$, of the subtracting means 33 is connected directly to the input of the non-linear computer 36.

Thus for the fourth order system which was used as an example above, the non-linear computer from which a non-linear boundary in a two-dimensional phase space is derived, is instrumented in accord with a second order differential equation obtained by considering any two of the system time constants. The linear computer 35 is instrumented in accord with a differential equation resulting from the remaining system time constants, and this equation defines the operation which must be performed on the status difference signal to obtain the information required by the non-linear computer. In the example under consideration, there are two remaining time constants and a second order differential relation is obtained.

Figures 4, 6:
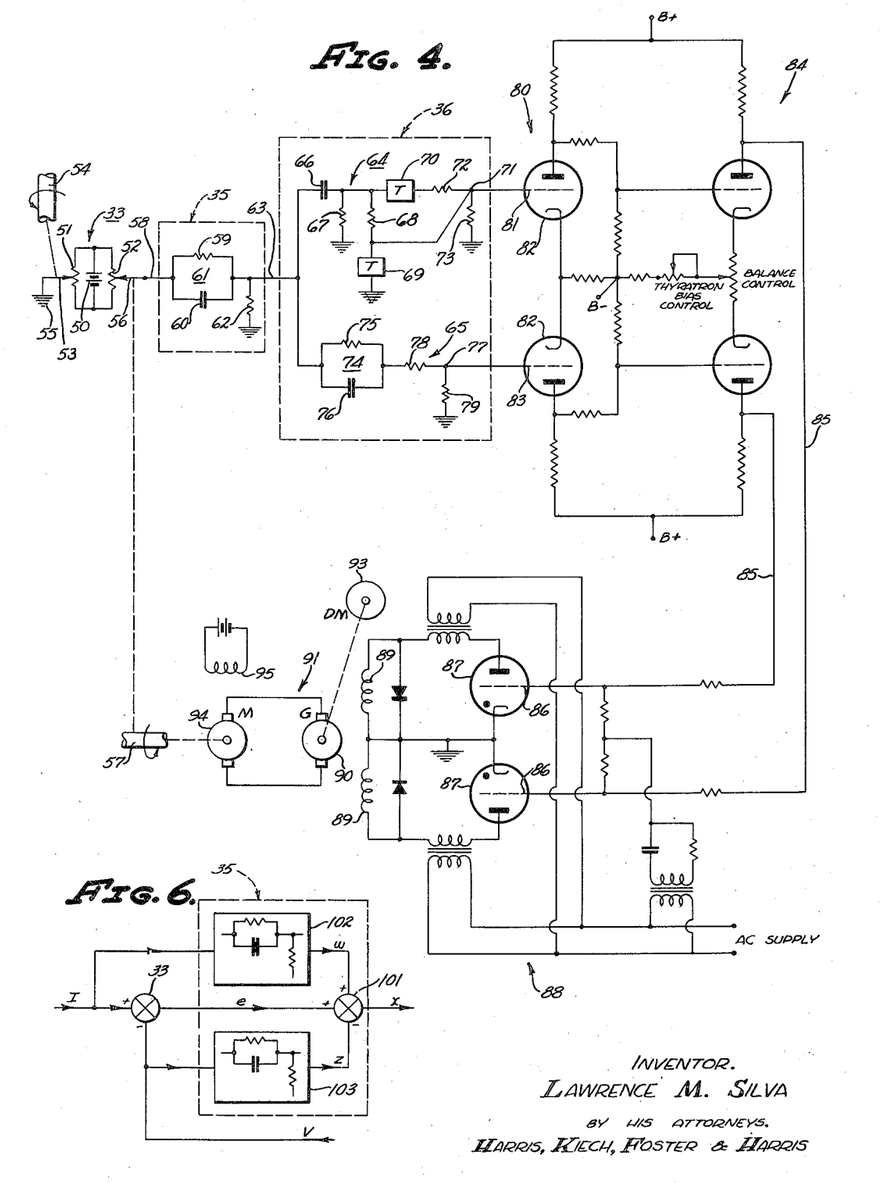
Fig. 4 is an exemplary instrumentation of the embodiment of the invention shown in Fig. 2.
Fig. 6 is a diagram indicating alternative exemplary instrumentation for a portion of the embodiment of Fig. 2.

If the time constants $T_1$ and $T_2$ are instrumented in the non-linear computer 36, the $T_3$ and $T_4$ time constants will appear in the linear computer 35. The output, $x$, of the linear computer is a function of its input, $e$ as expressed by the equation:

$$x = (DT_3+1)(DT_4+1)e$$

or $$x = b_2\frac{d^2e}{dt^2} + b_1\frac{de}{dt} + e$$

where $b_1$ equals $T_3+T_4$ and $b_2$ equals $T_3T_4$. This equation constitutes the linear operation performed by the computer 35 and describes the information which must be furnished to the non-linear computer 36. In a practical embodiment of this invention the $x$ variable, or information which is furnished to the non-linear computer may be obtained by applying the difference signal to a conventional passive or active electrical lead network or to a mechanical or pneumatic differentiating mechanism or may be obtained by a combination of means operating on the controlling element status and the controlled element status as shown subsequently in conjunction with Fig. 6. Hence the output, $x$, will be a linear integro-differential function of the input, $e$, when a passive lead network is used or a linear differentiating function when components of the other types referred to are used.

If the expression for $x$ is substituted into the equation defining all the time constants another second order differential equation is obtained:

$$a(DT_1+1)(DT_2+1)x = -\begin{cases} A \text{ max.} \\ A \text{ min.} \end{cases}$$

This equation can be converted to a first order differential equation involving the variables $x$ and $\dot{x}$:

$$\frac{d\dot{x}}{dx} = \frac{-\begin{pmatrix}\dfrac{A\text{ max.}}{a}\\ \dfrac{A\text{ min.}}{a}\end{pmatrix} - (T_1+T_2)\dot{x} - x}{T_1 T_2 \dot{x}}$$

where $\dot{x}$ is the derivative with respect to time $$\frac{dx}{dt}$$

The solutions of this new first order equation are the functional relation satisfied by $x$ and $\dot{x}$ given the initial conditions and the value of the corrective action A max. or A min. Since only a restricted amount of information is required from these solutions, it is convenient to discuss the solutions of this equation in the $x$—$\dot{x}$ phase plane. In general, it will be found that the solutions of the equation define two families of curves in the $x$—$\dot{x}$ phase plane. One of these families represents the trajectories of the second order system having the time constants $T_1$ and $T_2$ for corrective action A max. and the other family represents the trajectories of the system when the corrective action A min. is applied.

Figure 3:
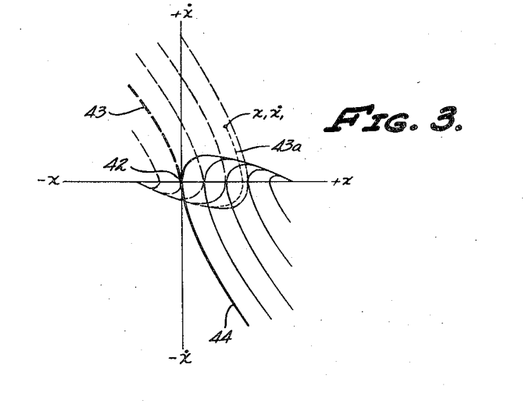
Fig. 3 is a further graph explanatory of the operation of the invention.

A plot of the $x$—$\dot{x}$ phase plane showing families of trajectories is illustrated in Fig. 3. The abscissa represents the magnitude of the output, $x$, of the linear computer 35 and the ordinate is the rate-of-change or derivative of this output, $\dot{x}$. The solid curves are applicable when the corrective action is A min. and the dashed curves when the corrective action is A max. For the instrumentation of the non-linear computer, a section of each of the two trajectories which pass through the origin 42 of the phase plane are significant. The particular solutions of the first order differential equation which define a combination trajectory consisting of the upper half of curve 43 and the lower half of curve 44 is instrumented in the non-linear computer 36 to produce the output, $y$. The first corrective action to be called for by the computer will be of a polarity tending to reduce the difference in status, and is determined by the position of the value of $x$ and $\dot{x}$ with respect to the curve 43, 42, 44 described by this combination trajectory. When this first corrective action is applied, the instantaneous value of $x$ and $\dot{x}$ will move along one of the trajectories toward the curve 43, 42, 44. When the values of $x$ and $\dot{x}$ coincide with the curve 43, 42, 44 and corrective action of opposite polarity is applied, the second order system having the time constants $T_1$ and $T_2$ will follow this trajectory to the origin 42 where the magnitude and rate-of-change of the magnitude of $x$ are both zero. For example, assume that an error producing a linear computer output of magnitude $x_1\dot{x}_1$ is introduced into the system. A plot of the values of $x$ and $\dot{x}$ as this error is reduced to zero is shown on Fig. 3. During the first phase of corrective action, the system follows the dotted curve 43a until it intersects the solid curve 44. At this point the sense of the corrective action reverses and the system follows the solid curve 44 to the origin 42. Since the output of the non-linear computer is zero when the values of $x$ and $\dot{x}$ coincide with the combination trajectory 43, 42, 44, the system will actually follow a curve very slightly to the left of curve 44 thereby producing an output which corresponds to the second phase of corrective action. The arrival at this point 42 corresponds to the end of the second phase of corrective action 28 of Fig. 1. Corrective action is removed at this point and the controlled system is on a natural trajectory that in a short period will satisfy the requirement that the difference in status and all its derivatives equal zero. The operation of an ideal servo control system embodying the invention consists of a single period of maximum corrective action followed by a single period of maximum corrective action in the opposite sense. At the end of the second period of corrective action the theoretical system is on a natural force free trajectory that will pass through the origin of the $n$ dimensional phase space which describes the motion of the system. In practice, it is found that errors corrupt this idealized operation and that varying corrective action must be applied during the final period in order that the difference in status and its derivatives shall be reduced to zero in the optimum manner.

Thus, in a practical embodiment of this invention, the controlled element enters a state of proportional control as the difference in status and its derivatives approach zero. The term "proportional control" is used in the sense that the output of the non-linear computer is not sufficient to drive the limiting means to saturation or its maximum level. Since the output of the non-linear computer is zero if the magnitude of $x$ and $\dot{x}$ are both zero, it is evident that any small deviations of these quantities will produce an output signal that will energize the controlled element in proportion to the magnitude of the deviations. If this magnitude is less than the minimum energization required to drive the limiting means to its saturation or maximum level, then the magnitude of the corrective action applied to the controlled element will be proportional to the magnitude of these deviations.

The invention has been applied in the above example to a fourth order system but it is equally applicable to any order system. For higher order systems the computer instrumentation will be more complex but the method of control utilizing the information contained in all of the time constants of the system is identical. Conversely in second and third order systems the instrumentation will be simpler.

Fig. 4 is a schematic representation of a servo control system in which the teaching of the invention is employed to control the position of a rotatable shaft. One application of this embodiment would be the control of the train or elevation of a gun in response to the commands of a fire control computer. The subtracting means 33 consists of a D. C. voltage source 50 and two potentiometers 51, 52. The arm 53 of potentiometer 51 is mechanically connected to a rotatable shaft 54 and electrically connected to ground as indicated at point 55 and serves as a sensing means producing a signal representative of the position of the shaft 54. The shaft corresponds to the controlling element 31 of Fig. 2, and is connected mechanically to the output of a fire control computer not illustrated in the diagram.

The arm 56 of the potentiometer 52 is mechanically connected to a second rotatable shaft 57 and electrically connected to the input 58 of the linear computer 35 and serves as a sensing means for the shaft 57. The electrical signal appearing at the input 58 is representative of the difference in angular position of the shafts 54 and 57. The input 58 is connected to one end of a parallel combination 61, consisting of a resistor 59 and a capacitor 60. The other end of this parallel combination 61 is connected to ground through a resistor 62 and also connected directly to the output 63 of the linear computer 35. In this embodiment of the invention, the computers 35 and 36 have been instrumented solely with passive network components requiring no energy sources. This is a simple and economical method of instrumenting the computers; however, it is not intended to restrict the practice of the invention to the use of passive components.

The output 63 of the linear computer 35 corresponds to the input of the non-linear computer 36, and is connected to two networks 64, 65. In network 64 the input 63 is connected to a capacitor 66. The capacitor 66 is connected to ground through a resistor 67 and also to ground through a serially connected combination of a resistor 68 and a thyrite component 69. Thyrite is a conducting material whose resistance decreases in the ratio of approximately twelve to one when the voltage applied to it is doubled. The capacitor 66 is also directly connected to a second thyrite component 70 which in turn is connected to a terminal 71 through a resistor 72. The terminal 71 is connected to ground through a resistor 73. The terminal 71 is also connected to the series combination 68, 69 at a point intermediate the resistor 68 and the thyrite component 69.

In the network 65 the input 63 is connected to one end of a parallel combination 74 consisting of a resistor 75 and a capacitor 76. The other end of the parallel combination 74 is connected to a second terminal 77 through a resistor 78. The terminal 77 is connected to ground through a resistor 79. The terminals 71, 77 may be connected together to produce the output of the non-linear computer 36. However, in the embodiment illustrated in Fig. 4 it is more convenient to combine the signals appearing at the terminals 71, 77 in a difference amplifier 80. Terminal 71 is connected to the control grid 81 of one of a pair of triode vacuum tubes 82 operated as a difference amplifier, and the terminal 77 is connected to the control grid 83 of the second tube of the difference amplifier 80. The output of the difference amplifier is further amplified in a conventional voltage amplifier 84. An output 85 of the voltage amplifier 84 is connected to control grids 86 of a pair of thyratron tubes 87 which are connected in a conventional circuit 88 to supply the excitation current for a split field winding 89 of a generator 90 of a Ward-Leonard drive system 91. The ward-Leonard drive system 91 consists of a drive motor 93, a generator 90 with a separately excited field winding 89, an output motor 94 energized by the generator 90, and a separately excited field winding 95 for the output motor.

In this embodiment of the invention, the thyratron amplifier 88 corresponds to the limiting means 37 of Fig. 2. The maximum output of the motor 94 of the Ward-Leonard drive system 91 is controlled by the excitation produced by the field winding 89 of the generator 90, and this in turn is controlled by the plate current of the thyratron tubes 87. Hence in this embodiment the two predetermined limits of the limiting means are controlled by the characteristics of the components of the thyratron amplifier 88. The output motor 94 is mechanically connected to the shaft 57 and rotates the shaft 57 to obtain positional agreement with the shaft 54. The shaft 57 corresponds to the controlled element 32 of Fig. 2 and is mechanically connected to the carriage of the gun being controlled. The gun and carriage are not illustrated.

Figure 5:
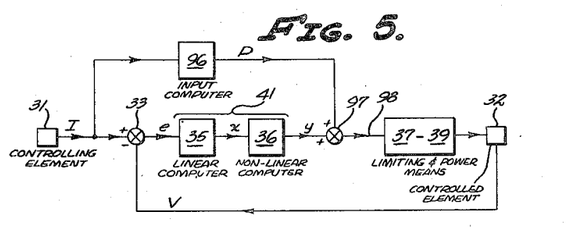
Fig. 5 is a block diagram of an alternative embodiment of the invention.

Various modifications of the servo control system illustrated in Figs. 2 and 4 may be made, depending upon the particular characteristics of the system being controlled, the degree of accuracy required and the economic factors involved. For example, the relative position of the limiting means 37 and the power means 39, as shown in Fig. 2, is not significant. The limiting may take place after the controller has energized the power means or the limiting may be inherent in the power means. In Fig. 5 the limiting means and the power means are shown diagrammatically lumped together. Consider a system for the control of the flow of a liquid in a pipe in which the power means consists of an electric motor driving a valve. There the limits on the flow in the pipe can be the full open and the shut positions of the valve and then zero and the maximum rate of flow would constitute the predetermined limits of the limiting means.

The amount of corrective action necessary during the third or proportional phase of control may be reduced by making refinements in the servo control system. In the mathematical analysis of the fourth order system leading to the expression for the system time constants, it was assumed that variations in the controlling element status were negligible in comparison to the magnitude of C. Then any errors in prediction existing due to this assumption would be corrected in the proportional control phase. In Fig. 5 a method of compensating for this error is illustrated diagrammatically. The controlling element status signal, I, is connected to an input computer 96. The output, P, of the input computer, and the output, y, of the non-linear computer 36 are coupled to an adding means 97. The adding means output is the sum of its inputs and is connected to the limiting and power means 37, 39 by a connection 98. The output, P, of the input computer 96 is a linear integro-differential function of the input, I, and is proportional to the magnitude of the controlling element status and its derivatives. In all other respects the components illustrated in Fig. 5 are identical with those illustrated in Fig. 2. In a practical application of this invention the number of derivative terms included in P is arbitrary and will be determined from economic considerations. The effect of using only lower derivatives is to only partly compensate for variations in the controlling element status and its derivatives.

Figure 7:
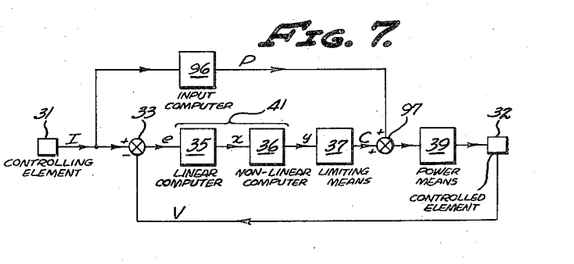
Fig. 7 is a block diagram of a further modification of the invention.

The output, P, of the input computer may be injected into the servo control systems after the limiting means if a greater degree of compensation is desired. Referring to Fig. 7, this can be accomplished by connecting the adding means 97 intermediate the limiting means 37 and the power means 39, rather than ahead of both as illustrated in Fig. 5.

Fig. 6 is a diagrammatic representation of a second instrumentation of the linear computer 35. The computer consists of a summing or detector means 101, which may be similar in construction and operation to the subtracting means 33 of Fig. 2, and two linear integro-differential networks or mechanism 102, 103. The controlling element status, represented as I, is connected to the subtracting means 33 and the network 102. Similarly the controlled element status, represented as V, is connected to the subtracting means and the network 103. The output, e, of the subtracting means 33, and the output of the networks 102, 103 are connected to the summing means 101. The output of the summing means is $x$, the output of the linear computer 35. For the fourth order system under consideration it was required that:

$$x = b_2 \frac{d^2 e}{dt^2} + b_1 \frac{de}{dt} + e$$

$x$ may be written in part in terms of the controlling element status, I, and the controlled element status V, by substituting $I - V$ for $e$:

$$x = \left(b_2 \frac{d^2 I}{dt^2} + b_1 \frac{dI}{dt}\right) - \left(b_2 \frac{d^2 V}{dt^2} + b_1 \frac{dV}{dt}\right) + e$$

or $$x = w - z + e$$

The first bracket or $w$ gives the requirements for instrumenting the network 102 and the second bracket or $z$ gives the requirements for the network 103. The networks 102 and 103 are diagrammatically illustrated in Fig. 6 as constituted of resistor and capacitor elements. While this is ordinarily the simplest method of instrumenting the networks, it is to be understood that the invention is not limited to the use of such elements.

The usefulness of this modification of predictor control systems lies in the fact that in many instances, it is not practical to obtain the higher derivatives of the controlling element status. Under these circumstances some or all of the derivatives of the controlling element status which should be furnished by the network 102 are neglected. Since the non-linear computer 36 which utilizes the output, $x$, of the linear computer 35 includes first order differentiation means the omission of all of the derivatives in the network 102 will provide predictor operation based on first derivative prediction of the controlling element status. If the network 102 is constructed to include first order differentiation means, $$\frac{dI}{dt}$$

then the predictor control system operation is based on a first and second derivative prediction of the controlling element status. Since the omission of some of the derivatives of the controlling element status degrades the prediction of this quantity, the controller will be required to furnish additional corrective action and/or introduce a proportional corrective action during the final phase. This additional corrective action is a consequence of the error made in predicting the future excursions of the controlling element and does not reflect a departure from the method of operation described in this specification.

Although I have disclosed several exemplary embodiments of my invention and have discussed its application to the control of a particular type of system, it will be understood that other applications of the invention are possible and that the embodiments disclosed may be subjected to various changes, modifications and substitutions without necessarily departing from the spirit of the invention.

I claim as my invention:

1. In a servo control system for reducing a difference in status between a controlled element and a controlling element, said system including sensing means producing signals respectively representative of the status of said controlled and controlling elements, the combination of: error-signal means connected to said sensing means producing an error signal substantially equal to said difference in status; computer means producing an output which is a continuous non-linear differential function of its input; means for supplying said error signal as the input to said computer means; a power system producing an output that is continuously variable in magnitude between two predetermined limits; means connecting the output of said computer means to said power system for controlling said power system so that said output of said power system can be varied from one of said limits through a proportional region to the other of said limits in response to corresponding variations in said output of said computer means; and means connecting said output of said power system to said controlled element.

2. A servo control system as defined in claim 1 in which said computer means is constituted entirely of passive components.

3. A servo control system as defined in claim 1 in which said computer means includes linear and non-linear computers connected serially between said error-signal means and said power system.

4. A predictor type servo control system for reducing to zero in substantially a minimum of time the status difference between controlled and controlling elements, said control system including: a measuring means for determining the instantaneous status difference between said elements; a controller having an input connected to said measuring means to receive an error signal representing said status difference, said controller including computer means producing an output which is a non-linear differential function of such error signal; a power means having an output adapted to be operatively connected to said controlled element, said output being continuously variable in magnitude between two predetermined limits; and means connecting the output of said computer means to said power means for controlling said power means so that said output of said power means can be varied from one of said limits through a proportional region to the other of said limits in response to corresponding variations in said output of said computer means.

5. A predictor type servo control system as defined in claim 4 in which said computer means receives information concerning the instantaneous status difference from said measuring means and in which said computer means includes means for computing at least the first differential of said status difference and for varying its output in accordance therewith.

6. In a servo control for a system having a controlled element, a controlling element and measuring means for determining a difference in status between said controlled and controlling elements, the combination of: a first computer means having an input and an output, said output being a linear integro-differential function of said input; means connecting said measuring means to said input of said first computer means; a second computer means having an input and an output, said output of said second computer means being a non-linear function of said input thereof; means connecting said output of said first computer means to said input of said second computer means; a power system producing an output that is continuously variable in magnitude between two predetermined limits; means connecting said output of said second computer means to said power system for controlling said power system so that said output of said power system can be varied from one of said limits through a proportional region to the other of said limits in response to corresponding variations in said output of said second computer means; and means connecting said output of said power system to said controlled element.

7. In a third or higher order servo control system for reducing a difference in status between controlled and controlling elements in a minimum of time, including sensing means producing signals reprensentative of the status of said controlled and controlling elements, the combination of: a power system having an input and producing an output which is operable at first and second predetermined outputs and is variable therebetween respectively in response to first limit, second limit and intermediate variable-magnitude signals supplied to said input of said power system; means for operatively connecting said power system to said controlled element to control the latter; computer means comprising a composite network producing an output which is a non-linear differential function of said difference, said composite network comprising means responsive to said difference for sequentially producing said first limit, second limit and intermediate signals supplied to said input of said power system; and means for supplying to said computer signals representing said difference in status.

8. In combination with a control system of $n$th order having $n$ time constants, $T_1, T_2 \ldots T_n$, and having a controlled element, a controlling element, a power unit driving said controlled element with an output continuously variable between two limits and sensing means for determining the difference in status between said controlling element and said controlled element, the value of $n$ being at least three; a computer means consisting of a linear computer and a non-linear computer, said non-linear computer being instrumented in accordance with two of said time constants and said linear computer being instrumented in accordance with the remaining said time constants.

9. In a servo control system for reducing a difference in status between a controlled element and a controlling element, including sensing means producing signals representative of the status of said controlled and controlling elements, the combination of: a first computer means producing an output which is a linear integro-differential function of said difference; means coupling each of said sensing means to said first computer means; a second computer means producing an output which is a nonlinear function of the output of said first computer means; means connecting said output of said first computer means to said second computer means; a third computer means having an input and an output, said output being a linear integro-differential function of said input; means connecting said controlling element sensing means to said input of said third computer means; a summing means producing an output which is the algebraic sum of its inputs; means connecting said output of said second computer means and said output of said third computer means to said inputs of said summing means; a power system producing an output that is continuously variable in magnitude between two predetermined limits; means connecting said output of said summing means to said power system in controlling relationship; and means connecting said output of said power system to said controlled element.

10. In a servo control system having a controlled element, a controlling element, and sensing means producing outputs representative of the status of said controlled and controlling elements, the combination of: a first network means generating a first signal which is a linear integro-differential function of the status of said controlled element; means connecting said controlled element sensing means to said first network means; a second network means generating a second signal which is a linear integro-differential function of the status of said controlling element; means connecting said controlling element sensing means to said second network means; subtracting means, circuit means connecting both of said sensing means to said subtracting means, said subtracting means output being the difference between said sensing means outputs; summing means producing an output which is proportional to said first and second signals and said subtracting means output; means connecting said summing means to said first and second network means; computer means producing an output which is a non-linear function of said output of said summing means; means connecting said output of said summing means to said computer means; a power system producing an output that is continuously variable in magnitude between two predetermined limits; means connecting said output of said computer means to said power system; and means connecting said output of said power system to said controlled element.

11. In a servo control system for reducing a difference in status between a controlled element and a controlling element, including sensing means producing signals representative of the status of said controlled and controlling elements, the combination of: a first computer means producing an output which is a linear integro-differential function of said difference; means coupling each of said sensing means to said first computer means; a second computer means producing an output which is a nonlinear function of the output of said first computer means; means connecting said output of said first computer means to said second computer means; a third computer means having an input and an output, said output being a linear integro-differential function of said input; means connecting said controlling element sensing means to said input of said third computer means; limiting means producing an output that is continuously variable in magnitude between two predetermined limits; means connecting said output of said second computer means to said limiting means; a summing means producing an output which is the algebraic sum of its inputs; means connecting said output of said limiting means and said output of said third computer means to said inputs of said summing means; a power means; means connecting said output of said summing means to said power means in controlling relationship; and means connecting the output of said power means to said controlled element.

12. In a third or higher order servo control system for reducing a difference in status between controlled and controlling elements in a minimum of time, including sensing means producing signals representative of the status of said controlled and controlling elements, the combination of: a power system producing an output continuously variable within two predetermined limits; means for operatively connecting said power system to said controlled element to control the latter; computer means producing an output which is a continuous non-linear integro-differential function of said difference; means for connecting said output of said computer in controlling relationship to the input of said power system so that said output of said power system can be varied from one of said limits through a proportional region to the other of said limits in response to corresponding variations in said output of said computer; and means coupling each of said sensing means to said computer means.

13. A servo control system as defined in claim 12 in which said computer means is constituted entirely of passive components.

14. A servo control system as defined in claim 12 in which said computer means includes a first branch producing a non-linear integro-differential function of said difference in status and a second branch producing a linear integro-differential function of said difference in status.

15. A servo control system as defined in claim 14 including a subtracting means, and connecting means coupling the output of said first branch and the output of said second branch respectively to said subtracting means, the output of said subtracting means being connected to said input of said power system.

16. A servo control system as defined in claim 12 in which said computer means includes a first branch producing a nonlinear integro-differential function of said difference of status and a second branch producing a linear integro-differential function of the status of said controlling element.

17. A servo control system as defined in claim 16 including means for algebraically adding the outputs of said branches at a position ahead of said power system.

18. A servo control system as defined in claim 16 in which said power system includes a limiting means and a power means serially connected, the input of said limiting means being connected to the output of said first branch, and including means for algebraically adding the outputs of said second branch and said limiting means, said means for adding being connected intermediate said power means and said limiting means.

19. A servo control system as defined in claim 12 in which said computer means includes two computers serially connected to said input of said power system with the first of said computers producing a linear integro-differential function of said difference and with the second of said computers connected intermediate the first of said computers and said power system and producing a non-linear function of said linear integro-differential function.

20. In a servo control for a system having a controlled element, a controlling element and measuring means for determining a difference in status between said controlled and controlling elements, the system being capable of being represented by an $n$th order differential equation, the combination of: a first computer means having an input and an output, said output being a linear integro-differential function of said input; means connecting said measuring means to said input of said first computer means; a second computer means having an input and an output, said output of said second computer means being a nonlinear function of said input thereof, said second computer means being instrumented in accordance with a second order differential equation derived from said $n$th order differential equation, said first computer means being instrumented in accordance with an $n-2$ order differential equation corresponding to the difference between said $n$th order differential equation and said second order differential equation; means connecting said output of said first computer means to said input of said second computer means; a power system producing an output that is continuously variable in magnitude between two predetermined limits; means connecting said output of said second computer means to said power system; and means connecting said output of said power system to said controlled element.

21. In a servo control system for reducing a difference in status between controlled and controlling elements in a minimum of time, the system being capable of being represented by an $n$th order differential equation, $n$ being greater than 2, and including sensing means producing signals representative of the status of said controlled and controlling elements, the combination of: a power system producing an output continuously variable within two predetermined limits; means for operatively connecting said power system to said controlled element to control the latter; computer means producing an output which is a continuous nonlinear integro-differential function of said difference, said computer means including a nonlinear network instrumented in accordance with a second order differential equation derived from said $n$th order differential equation; means for connecting said output of said computer means in controlling relationship to the input of said power system; and means coupling each of said sensing means to said computer means.

References Cited in the file of this patent

UNITED STATES PATENTS

| 2,663,832 | McDonald et al. | Dec. 22, 1953 |
| 2,701,328 | Woodruff | Feb. 1, 1955 |

OTHER REFERENCES

Ahrend and Taplin: Automatic Feedback Control, page 54, Figures 3–2, page 55, McGraw-Hill, 1951.

U. S. DEPARTMENT OF COMMERCE
PATENT OFFICE

CERTIFICATE OF CORRECTION

Patent No. 2,829,329 April 1, 1958

Lawrence M. Silva

It is hereby certified that error appears in the printed specification of the above numbered patent requiring correction and that the said Letter Patent should read as corrected below.

Column 2, line 27, for "action" read --actions--; column 7, lines 6 and 7, for "differentiating" read --differential--; column 9, line 44, for "ward-Leonard" read --Ward-Leonard--.

Signed and sealed this 20th day of May 1958.

(SEAL)
Attest:

KARL H. AXLINE
Attesting Officer

ROBERT C. WATSON
Commissioner of Patents